United States Patent [19]

Borjesson

[11] 4,284,185
[45] * Aug. 18, 1981

[54] APPARATUS FOR PRODUCING ELECTRICAL BATTERIES

[75] Inventor: Anders Borjesson, Alvangen, Sweden

[73] Assignee: Aktiebolaget Tudor, Sundbyberg, Sweden

[*] Notice: The portion of the term of this patent subsequent to Jan. 22, 1997, has been disclaimed.

[21] Appl. No.: 38,426

[22] Filed: May 14, 1979

Related U.S. Application Data

[62] Division of Ser. No. 805,584, Jun. 10, 1977, Pat. No. 4,184,582.

[51] Int. Cl.³ .................. B23P 19/00; B65G 23/00
[52] U.S. Cl. ................................. 198/339; 29/730
[58] Field of Search ............... 198/339; 29/623.1, 730; 164/108, 325, DIG. 1

[56] References Cited

U.S. PATENT DOCUMENTS

| | | | |
|---|---|---|---|
| 2,762,094 | 9/1956 | Vieth | 164/325 X |
| 3,504,731 | 4/1970 | Farmer | 164/270 |
| 3,612,246 | 10/1971 | Elze et al. | 198/509 |
| 3,744,112 | 7/1973 | Lindenberg et al. | 29/730 X |

Primary Examiner—Jeffrey V. Nase
Attorney, Agent, or Firm—Burns, Doane, Swecker & Mathis

[57] ABSTRACT

In the formation of a battery, electrodes are connected to connector bars by mounting the electrodes in cassettes on the side of a horizontal rotatable drum. By rotating the drum, the electrodes travel in a vertically oriented, circular travel path between various work stations. Rotary displacement of the electrodes involves forward and rearward movements. All forward movements are of equal distance. All rearward movements are of equal distance. However, the distances of forward movement are different from those of rearward movement. The work stations include an electrode receiving station, a fluxing station, a connector bar casting station, and an electrode removal station. A conveyor travels horizontally through the cylinder, carrying battery containers to receive the electrodes.

2 Claims, 10 Drawing Figures

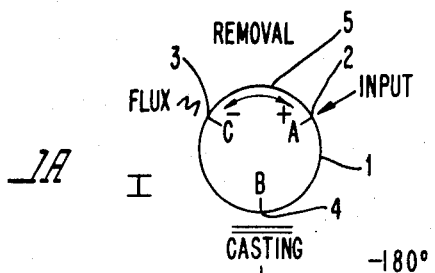
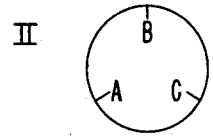
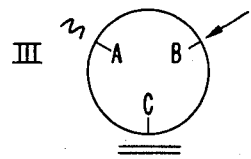
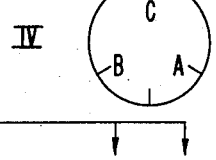
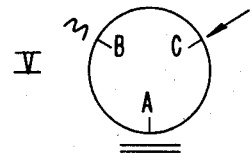
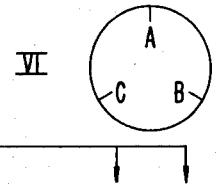
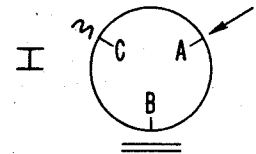
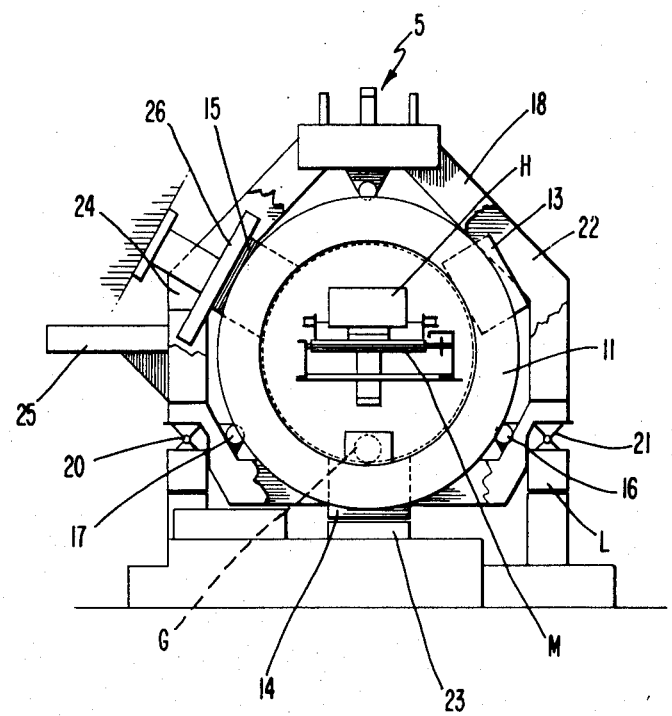

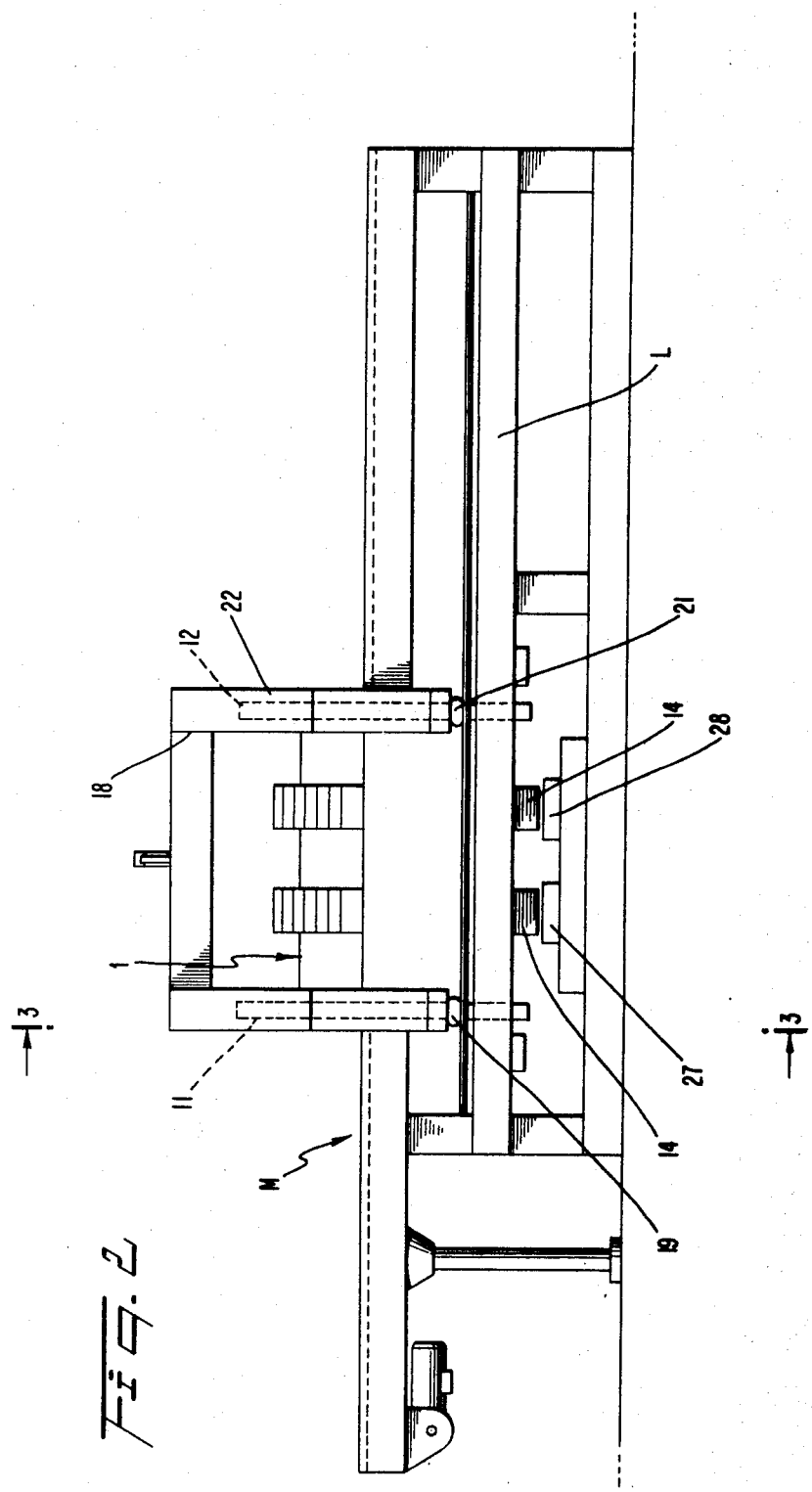

APPARATUS FOR PRODUCING ELECTRICAL BATTERIES

This is a division of application Ser. No. 805,584 filed June 10, 1977, and now U.S. Pat. No. 4,184,582 issued Jan. 22, 1980.

BACKGROUND AND OBJECTS

The present invention concerns the production of electrical accumulators or batteries. More specifically, it concerns the production of electrode sets or series comprising the casting of connector bars onto the electrodes that are of the same kind and belong to the same cell. The invention also concerns apparatus for the execution of the process.

In connection with the production of electrical accumulators, the electrodes which are to be present in a cell are collected together with the separating electrodes or isolating separators to form one electrode series.

Electrodes of the same type in each electrode series are then combined with one another by a connector bar. This bar can be produced in different ways and is placed in the cell vessel either before the electrodes or after them. Furthermore, electrodes of one type in a cell are to be connected with electrodes of another type in an adjoining cell. This combining can be effected simultaneously with the connector bars or in a subsequent operation. Several procedures and equipment are known, either separately or in combination with cell connectors. Such equipment is provided with one or several cassettes, each of which can receive all the electrode series belonging to one battery and provide the latter with connector bars.

The equipment has been developed according to two principles, either with a cassette moving forward and back, which runs along a linear course, or else a type of revolving device, where each device is equipped with a number of arms, each one of which has one or several cassettes. In the former case, a relatively low production capacity is obtained, and in the latter case the constructions are complicated, as the arms of the carousel must be able to rotate about their longitudinal axes.

It is, therefore, an object of the present invention to minimize or eliminate problems of the type mentioned above.

It is another object of the present invention to provide novel methods and apparatus for producing electric accumulators.

It is a further object of the invention to provide such apparatus which receives the electrode series, carries out a possibly necessary fluxing treatment of the terminals of the electrodes, casts or fuses connector bars on the electrode series, and then places these in the battery container.

A further object of the invention is to provide a system having the same production capacity as the best techniques and equipment now known, but involving a mechanically simpler construction and requiring only slight manual service.

Another object is to provide apparatus which is flexible in its utility so that its capacity can be increased, if necessary.

BRIEF SUMMARY

Apparatus according to the invention, which fulfills the above-mentioned requirements and objectives, has the characteristic that the electrode series are made to carry out movements along a vertically lying circle-shaped course. On this course there are work stations for the supplying of the electrode series, the treatment of the terminals of the electrodes with fluxing, the casting or welding of connector bars, and the transfer of the electrode series to the battery container. The electrodes can be placed in holders or cassettes, in which case each cassette contains all the electrode series belonging to a battery, which series thus move jointly along the circular course. The movements which the cassette or the electrode series are made to perform are forward and backward. The movements are carried out in stages, whereby the rotary movements in the same direction (i.e., forward or backward) are always equal and the movements in the opposite direction unequal. The amount of the movements is arranged in such a way that a certain point on the circular course carries out a gradual transfer between the different work operations and then returns to the initial position. This is achieved by having the movements in one direction enclose one half of the circle-shaped course while the movements in the other direction enclose one sixth of the course. According to this procedure, at some time during the carrying out of the process each electrode series comes to be at each of six stations equally distributed along the circle-shaped course. A work operation can be carried out at each one of these stations, but since in general only the above enumerated moments occur, certain stations become so-called blind stations, which can be utilized, for example, for the cooling off of newly cast connector bars or to provide the fluxing with additional time to condition the electrode terminal.

THE DRAWINGS

The preferred method and apparatus for the execution of this invention will now be described in connection with the accompanying figures in which:

FIGS. 1A–1G show a sequence of steps of the method according to the invention;

FIG. 2 shows a side view of the apparatus for the execution of the method;

FIG. 3 shows a section taken along line 3—3 of FIG. 2, with parts of a front support rack broken away for the sake of clarity.

DETAILED DESCRIPTION OF PREFERRED EMBODIMENT

Figure 4:
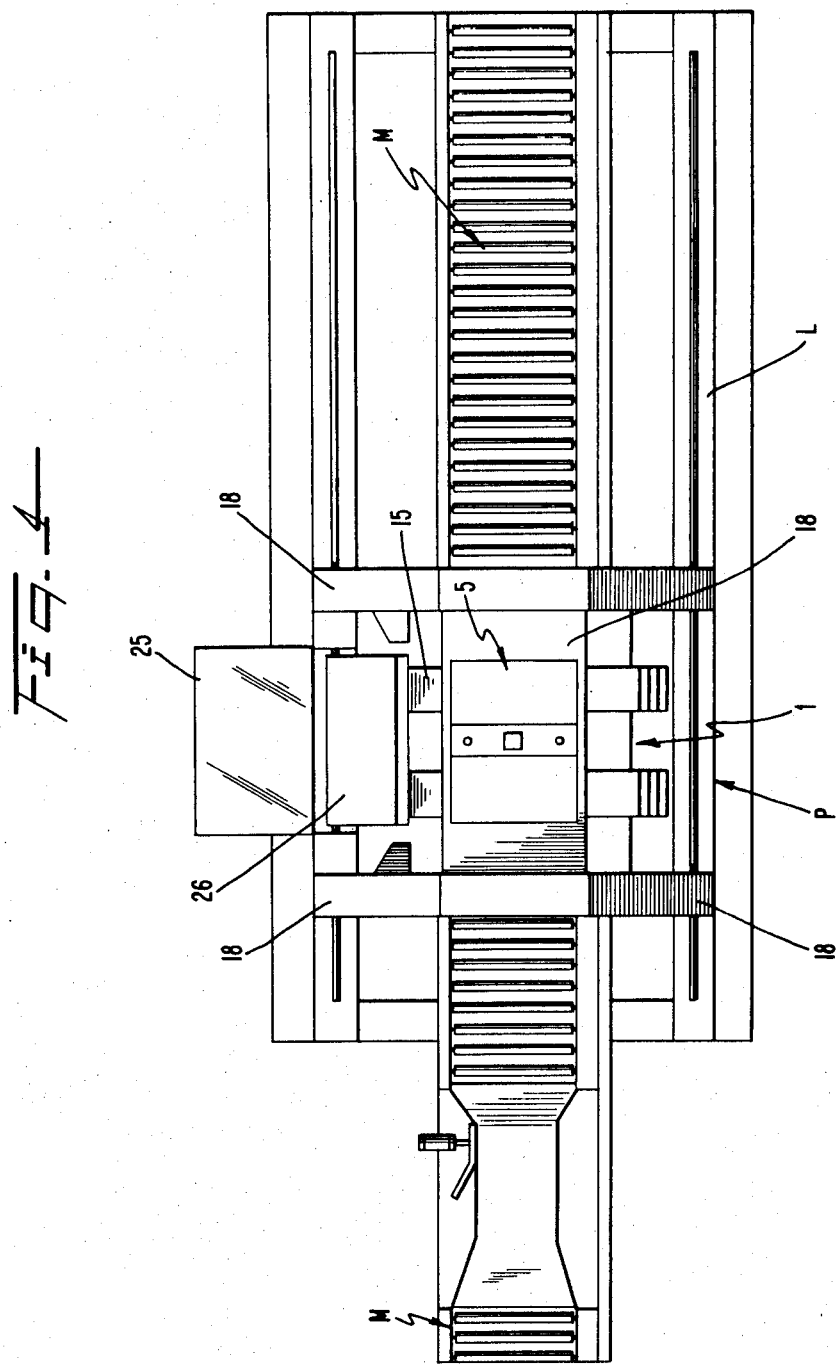
FIG. 4 shows a plan view of the apparatus.

The steps of the method depicted in FIG. 1 are as follows. Along a circle-shaped course 1 are found three work stations, namely a feeding or intake station 2, a fluxing processing station 3, and a casting station 4. There is also present a station 5 for the removal of finished electrode series from the processing course. On the circular course have also been posted three points (A,B,C) which follow the movements of the electrode series along the course and whose arrangement corresponds to the position of cassettes in which electrode series have been placed.

We now assume that point A on the circle-shaped course is at the intake station 2. Electrode series are put down in the cassette which is found at A, whereupon they are made to carry out a movement which in the figure is indicated by −180°, that is to say, a half turn to the left. Point A and the cassette then come to be in the position shown in FIG. 1B. There is no treatment of the electrode series at this station, and the next movement is indicated in the figure by +60° and involves a turn of one sixth to the right. The electrode series are then in a position at the pickling station 3 as shown in FIG. 1C. Here the electrode terminals are treated with flux, whereupon the electrode series are made to carry out a new movement of −180°. They thereupon stop at a station which is indicated by A in FIG. 1D, where no treatment of the electrode series is carried out, but here the flux has occasion to affect the surface of the terminals. Then follows a new turn of −60°, so that the electrode series are placed at the casting station (FIG. 1E). Here the casting of the connector bars takes place, whereupon a movement of −180° is carried out. The electrode series are then farthest up on the circle-shaped course, where they are removed from the latter. The course then carries out a new movement of +60°, with the result that point A has again reached its starting position, as is shown in FIG. 1G. The same movement, but from different starting positions, has then been carried out by points B and C on the circle-shaped course, which represent additional cassettes in the device. At places where point A is not treated, one or both of the other points are in a treatment station. For instance, in FIG. 1B there is no treatment of point A, but point B is at the removal station.

Apparatus for the execution of the method is shown in FIGS. 2, 3 and 4 has as its most essential component a horizontally extending cylinder or drum 1, on the mantle surface of which there are disposed cassettes 13, 14, 15 (FIG. 3) for the reception of the electrode series. The cylinder can rotate about its horizontal, longitudinal axis. This cylinder includes two end rings 11 and 12. Axially between these rings, the cassettes 13, 14 and 15 are fixed on the cylinder. The rings 11, 12 rest on wheels or rolls 16 and 17. By this means, the cylinder can be made to rotate about its axis.

The cylinder is surrounded by a rack or frame 18 which carries the wheels 16, 17 and thus supports the cylinder. The frame 18 can be shifted along its base L in the direction of the horizontal cylinder axis via a wheel mounting 19, 20, 21 or similar arrangements. The cylinder 1 is rotated by a power driven gear G which meshes with toothing internally of the ring 11. Around the cylinder are present a receiving or charging station 22, a casting station 23 and a flux-treatment station 24.

The electrode series are placed in a cassette found at the feeding station. At the flux station 24 the fluxing substance is present in a container 25 and is applied to the terminals of the electrodes by means of a reciprocable arm 26. At the casting station, there are present casting forms 27, 28, made movable by a vertical hinge or joint toward and away from the cassette. There are also present arrangements not shown in the figure for the conveying of lead for the casting of the connector bars. Finally, there runs through the center of the cylinder a transport track in the form of a belt or roller conveyor M, on which battery containers H are conveyed. After completed treatment in the apparatus, the electrode series pass, as mentioned above, to a position farthest up on the circle-shaped course. In this position, the electrode series are set free and are made to drop down or are pressed down into corresponding cell jars in the respective battery container. The apparatus shown in the figures is equipped for simultaneous treatment at the same treatment station of electrode series for two batteries. That is, two axially spaced sets of cassettes 13, 14, 15 are mounted on the cylinder, as can be seen in FIG. 3. The apparatus is thus provided with six cassettes, or three double cassettes. If greater capacity is desired, it is easily possible to lengthen the cylinder along the direction of the cylinder axis and thus provide room for additional cassettes.

In operation, electrodes are conveyed to the cylinder in a direction perpendicular to the axis thereof along the direction P in FIG. 4. The electrode series are inserted and secured within the cassette at the electrode receiving station 22. The cylinder defines an upright, or vertically oriented, closed travel path for the cassettes. The cylinder is rotated in the manner previously discussed. That is, point A for instance is rotated:

(A) reversely by 180 degrees from the electrode-receiving station of FIG. 1A to the FIG. 1B position where no treatment is performed;

(B) forwardly by 60 degrees to the FIG. 1C position for a flux application;

(C) reversely by 180 degrees to the FIG. 1D position where the flux conditions the terminals of the electrodes;

(D) forwardly by 60 degrees to the FIG. 1E position where the electrodes are cast or welded to the connector bars;

(E) reversely by 180 degrees to the FIG. 1F position where the electrodes are removed from the cassette; and (F) forwardly by 60 degrees to the start position where a new set of electrodes are inserted.

Battery containers H are carried to the cylinder via conveyor M. Completed electrode series are removed from station 5 and are inserted into the container. The container is then transferred away in a direction along the cylinder axis.

It should be noted that the manner of feeding and inserting the electrodes, applying the flux, and casting or welding the connector bars is not essential to the present invention except as relating to the particular mode of displacement of the electrodes to the particular work stations, which forms the essense of the present invention.

It is possible to devise other forms of execution than those described above without abandoning the basic idea of the invention. The procedure described in the above example, however, has the advantage that the movements in a certain direction (i.e., forward or reverse) are always equal and that therefore automatization of the procedure is relatively simple.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In an apparatus for producing electrode sets for electrical accumulators having a plurality of electrode cells, by casting connector bars onto electrodes in each cell, said apparatus being of the type comprising a cylinder drum mounted for rotation about its longitudinal axis, a plurality of electrode-receiving cassettes mounted around the periphery of said cylinder drum, a plurality of work stations positioned adjacent said drum and spaced around the periphery thereof, the improvement wherein said cylinder drum axis is arranged substantially horizontally and comprises two end rings between which said cassettes are mounted to a peripheral surface of the drum, drive means engaging one of said end rings and rotating said drum alternately and intermittently in opposite directions to sequentially displace said cassettes relative to said work stations in a vertically oriented circular path of travel, said drive means rotating said drum such that the extent of each rotary movement of the drum in one direction is the same while being different from the extent of each rotary movement in the opposite direction.

2. Apparatus according to claim 1, wherein the extent of travel for each rotational movement in said one direction is three times that in the succeeding opposite direction.

* * * * *